(12) United States Patent
Zhao et al.

(10) Patent No.: US 11,686,986 B2
(45) Date of Patent: Jun. 27, 2023

(54) DISPLAY SUBSTRATE, METHOD FOR MANUFACTURING DISPLAY SUBSTRATE, AND DISPLAY DEVICE

(71) Applicants: Hefei BOE Optoelectronics Technology Co., Ltd., Anhui (CN); BOE Technology Group Co., Ltd., Beijing (CN)

(72) Inventors: Na Zhao, Beijing (CN); Xianxue Duan, Beijing (CN); Miao Yuan, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 15 days.

(21) Appl. No.: 17/472,518

(22) Filed: Sep. 10, 2021

(65) Prior Publication Data
US 2022/0236616 A1 Jul. 28, 2022

(30) Foreign Application Priority Data
Jan. 22, 2021 (CN) .......................... 202110089823.6

(51) Int. Cl.
*G02F 1/1362* (2006.01)

(52) U.S. Cl.
CPC .............................. *G02F 1/136295* (2021.01)

(58) Field of Classification Search
CPC ............ G02F 1/136295; G02F 1/1345; G02F 1/13452; G02F 1/13456; G02F 1/133357; G02F 1/133345; G02F 1/134372; G02F 2201/42
See application file for complete search history.

(56) References Cited

U.S. PATENT DOCUMENTS

2019/0018526 A1* 1/2019 Fu ......................... H01L 27/124
2019/0355765 A1* 11/2019 Li ....................... H01L 23/5223

* cited by examiner

*Primary Examiner* — Angela K Davison
(74) *Attorney, Agent, or Firm* — Ipro, PLLC (57) ABSTRACT

Disclosed are a display substrate, a fabrication method for the display substrate, and a display device. By arranging a flat layer with a flat surface facing the second metal layer between a first metal layer and a second metal layer, the second metal layer deposited on the flat layer is also relatively flat, so that the second metal wirings with the same width and spacing as that of first metal wirings can be formed. The etching resolutions of the metal wirings in the fanout region corresponding to the first metal layer and the second metal layer in the solutions of the present disclosure can be the same.

16 Claims, 8 Drawing Sheets

S601 — Providing a substrate; wherein the substrate is provided with a display region and a non-display region located on the periphery of the display region, and the non-display region is provided with a Fanout region and a via hole region located between the display region and the Fanout region S602 — Forming a first metal layer on the substrate; wherein the first metal layer comprises a plurality of first metal wirings located in the Fanout region S603 — Forming a flat layer on one side, deviating from the substrate, of the first metal layer; wherein an orthographic projection of the flat layer on the substrate at least covers an orthographic projection of the Fanout region on the substrate; in the Fanout region, a surface, furthest from the substrate, of the flat layer has a highest point having a maximum distance to a horizontal plane where the substrate is located and a lowest point having a minimum distance to the horizontal plane where the substrate is located, and the difference between the distance from the highest point to the horizontal plane where the substrate is located and the distance from the lowest point to the horizontal plane where the substrate is located is less than or equal to 1000 angstroms S604 — Forming a second metal layer on one side, deviating from the substrate, of the flat layer; wherein the second metal layer comprises a plurality of second metal wirings located in the Fanout region, and an orthographic projection of the first metal wirings on the substrate at least partially overlaps with an orthographic projection of the second metal wirings on the substrate

DISPLAY SUBSTRATE, METHOD FOR MANUFACTURING DISPLAY SUBSTRATE, AND DISPLAY DEVICE

CROSS-REFERENCE TO RELATED APPLICATION

This application is based on and claims priority under 35 U.S.C 119 to Chinese Patent Application No. 202110089823.6, filed on Jan. 22, 2021, in the China National Intellectual Property Administration. The entire disclosure of the above application is incorporated herein by reference.

FIELD

The present disclosure relates to the technical field of display, in particular to a display substrate, a method for manufacturing the display substrate, and a display device.

BACKGROUND

At present, people have higher and higher requirements for full display of display products, and full display and narrow borders have become the trend of display products.

A display panel typically includes a display region and a fanout region for wiring located at the periphery of the display region. The width of the fanout region directly determines the width of a bezel of the display panel. In order to reduce the width of the fanout region, the industry has developed a double-layer metal wiring method, each metal layer is provided with a plurality of signal wirings.

SUMMARY

Some embodiments of the present disclosure provide a display substrate, including a substrate including with a fanout region;

the display substrate includes a first metal layer, a flat layer, and a second metal layer which are sequentially formed on the substrate; an orthographic projection of the flat layer on the substrate at least covers an orthographic projection of the fanout region on the substrate; in the fanout region, a surface, furthest from the substrate, of the flat layer includes a highest point having a maximum distance to a horizontal plane where the substrate is located and a lowest point having a minimum distance to the horizontal plane where the substrate is located, and a difference between the maximum distance and the minimum distance is less than or equal to 1000 angstroms; and the first metal layer includes a plurality of first metal wirings located in the fanout region, the second metal layer includes a plurality of second metal wirings located in the fanout region, and an orthographic projection of the first metal wirings on the substrate at least partially overlaps with an orthographic projection of the second metal wirings on the substrate.

Optionally, in the above display substrate provided by embodiments of the present disclosure, the maximum distance is equal to the minimum distance.

Optionally, in the above display substrate provided by embodiments of the present disclosure, the display substrate further includes a first insulating layer located between the first metal layer and the flat layer, wherein an orthographic projection of the first insulating layer on the substrate covers the substrate.

Optionally, in the above display substrate provided by embodiments of the present disclosure, the display substrate further includes a second insulating layer located between the flat layer and the second metal layer, wherein an orthographic projection of the second insulating layer on the substrate at least covers the orthographic projection of the fanout region on the substrate.

Optionally, in the above display substrate provided by embodiments of the present disclosure, a thickness of the flat layer is greater than a thickness of the first metal layer.

Optionally, in the above display substrate provided by embodiments of the present disclosure, a width of each first metal wiring is identical to a width of each second metal wiring, and a gap width between adjacent first metal wirings is identical to a gap width between adjacent second metal wirings.

Optionally, in the above display substrate provided by embodiments of the present disclosure, an orthographic projection of the first metal wirings on the substrate completely overlaps with an orthographic projection of the second metal wirings on the substrate.

Optionally, in the above display substrate provided by embodiments of the present disclosure, the substrate further includes a display region located at one side of the fanout region, the first metal layer includes a gate electrode located in the display region, and the second metal layer includes a source electrode and a drain electrode which are located in the display region;

an orthographic projection of the flat layer on the substrate also covers an orthographic projection of the display region on the substrate, and the orthographic projection of the second insulating layer on the substrate also covers the orthographic projection of the display region on the substrate;

the display substrate further includes a first transparent conductive layer located between the second insulating layer and the second metal layer, a passivation layer located on one side, deviating from the substrate, of the second metal layer, and a second transparent conductive layer located on one side, deviating from the substrate, of the passivation layer; and the first transparent conductive layer is electrically connected with the drain electrode, the second transparent conductive layer includes a plurality of transparent signal lines located in the display region, and an orthographic projection of the first transparent conductive layer on the substrate overlaps with an orthographic projection of the plurality of the transparent signal lines on the substrate.

Optionally, in the above display substrate provided by embodiments of the present disclosure, the substrate further includes a via hole region located between the fanout region and the display region, the first metal layer includes a first transfer electrode located in the via hole region, and the second metal layer includes a second transfer electrode located in the via hole region;

the orthographic projection of the flat layer on the substrate also covers an orthographic projection of a part of the via hole region on the substrate, and the orthographic projection of the second insulating layer on the substrate also covers the orthographic projection of a part of the via hole region on the substrate;

the second transparent conductive layer includes a plurality of transparent wirings located in the via hole region;

a part of the transparent wirings are electrically connected with the first transfer electrode by a via hole sequentially running through the passivation layer, the second insulating layer, the flat layer, and the first insulating layer; and a part of the transparent wirings are electrically connected with the second transfer electrode by a via hole running through the passivation layer.

Accordingly, some embodiments of the present disclosure also provide a method for manufacturing the display substrate, including:

providing a substrate; wherein the substrate is provided with a fanout region;

forming a first metal layer on the substrate; wherein the first metal layer includes a plurality of first metal wirings located in the fanout region;

forming a flat layer on one side, deviating from the substrate, of the first metal layer; wherein an orthographic projection of the flat layer on the substrate at least covers an orthographic projection of the fanout region on the substrate; in the fanout region, a surface, furthest from the substrate, of the flat layer includes a highest point having a maximum distance to a horizontal plane where the substrate is located and a lowest point having a minimum distance to the horizontal plane where the substrate is located, and a difference between the maximum distance and the minimum distance is less than or equal to 1000 angstroms; and forming a second metal layer on one side, deviating from the substrate, of the flat layer; wherein the second metal layer includes a plurality of second metal wirings located in the fanout region, and an orthographic projection of the first metal wirings on the substrate at least partially overlaps with an orthographic projection of the second metal wirings on the substrate.

Optionally, in the above method provided by embodiments of the present disclosure, the method further includes, before forming the flat layer on one side, deviating from the substrate, of the first metal layer:

forming a first insulating layer located between the first metal layer and the flat layer; wherein an orthographic projection of the first insulating layer on the substrate covers the substrate.

Optionally, in the above method provided by embodiments of the present disclosure, the forming the flat layer on one side, deviating from the substrate, of the first metal layer specifically includes:

forming the flat layer having a thickness greater than a thickness of the first metal layer on one side, deviating from the substrate, of the first metal layer.

Optionally, in the above method provided by embodiments of the present disclosure, the method further includes, after forming the flat layer, and before forming the second metal layer:

forming a second insulating layer located between the flat layer and the second metal layer; wherein an orthographic projection of the second insulating layer on the substrate at least covers the orthographic projection of the fanout region on the substrate.

Optionally, in the above method provided by embodiments of the present disclosure, forming the plurality of the first metal wirings specifically includes:

coating one side, deviating from the substrate, of the first metal layer with a first photoresist layer; and exposing and developing the first photoresist layer to form the plurality of the first metal wirings;

forming the plurality of the second metal wirings specifically includes:

coating one side, deviating from the substrate, of the second metal layer with a second photoresist layer; and exposing and developing the second photoresist layer to form the plurality of the second metal wirings corresponding to the plurality of the first metal wirings.

Accordingly, some embodiments of the present disclosure also provide a display device, including the above display substrate provided by embodiments of the present disclosure.

BRIEF DESCRIPTION OF THE DRAWINGS

FIG. 6 is a flow diagram of a method for manufacturing a display substrate provided by some embodiments of the present disclosure;

DETAILED DESCRIPTION OF THE EMBODIMENTS

In order to make the objects, technical solutions and advantages of embodiments of the present disclosure more clear, the technical solutions of embodiments of the present disclosure will be clearly and completely described below in conjunction with the accompanying drawings of embodiments of the present disclosure. Obviously, the described embodiments are part of embodiments of the present disclosure, rather than all of embodiments. Moreover, embodiments of the present disclosure and the features in embodiments may be combined with each other without conflict.

Based on the described embodiments of the present disclosure, all other embodiments obtained by those of ordinary skill in the art without inventive effort fall within the scope of protection of the present disclosure.

Unless otherwise defined, the technical or scientific terms used in the present disclosure should have the general meanings understood by those of ordinary skill in the art to which the present disclosure belongs. Similar terms such as "including" or "comprising" used in the present disclosure mean that elements or objects appearing before the term encompass elements or objects listed after the term and equivalents thereof, without excluding other elements or objects. Similar terms such as "connection" or "connected" are not limited to physical or mechanical connections, but can include electrical connections, whether direct or indirect. "Inner", "outer", "upper", "lower" and the like are only used to indicate relative positional relationships, which may change accordingly when the absolute positions of the described objects change.

It should be noted that the size and shape of each figure in the drawings do not reflect the true scale, and the purpose is only to schematically illustrate the contents of the present disclosure. And the same or similar reference signs throughout represent the same or similar elements or elements having the same or similar function.

With the development of a display technology, display products need to be designed with narrow bezels to achieve perfect visual effects. The metal wirings of a lower bezel are a peripheral circuit connecting the effective display region of the display panel and a driver chip, which are called fanout signal lines. Therefore, it is necessary to reduce the line width and line spacing of the fanout region to reduce the occupied area of the fanout, thus realizing a narrow bezel. Wherein, the sum of the line width and the line spacing is called a fanout pitch.

Figure 1:
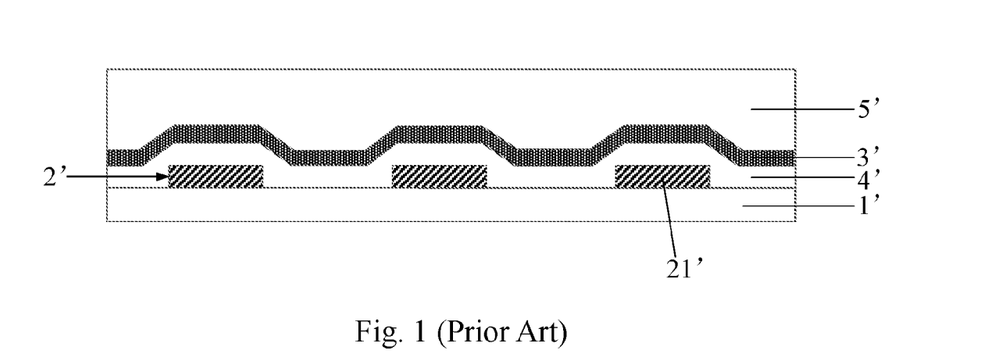
FIG. 1 is a structural schematic diagram of a display substrate in the related art.

An existing wiring design in the fanout region use two layers of metal to be overlapped to make the fanout region to reduce the signal line layout space in the fanout region, as shown in FIG. 1, a substrate 1', a first metal layer 2' and a second metal layer 3' are included, wherein the first metal layer 2' and the second metal layer 3' are stacked on the substrate 1', an insulating layer 4' is formed between the first metal layer 2' and the second metal layer 3', and the first metal layer 2' is exposed, developed and etched by a photoresist process to form a plurality of first metal wirings 21'. However, when manufacturing metal wirings on the second metal layer 3', firstly, the second metal layer 3' is coated with a photoresist layer 5', and the second metal layer 3' is also not flat due to the unflatness of the insulating layer 4', so the thickness of the photoresist layer 5' coating the second metal layer 3' is not uniform, resulting in poor exposure uniformity and affecting the fabrication accuracy of the second metal wirings on the second metal layer 3'. For example, in actual production, under the condition of ensuring that the metal wirings do not have open and short defects, the first metal wirings 21' of the first metal layer 2' can be made at a line width of 2.5 μm, a line spacing of 2.5 μm and a fanout pitch of 5.0 μm, but due to the influence of the process, the second metal layer 3' can be made only at a line spacing of 3.0 μm and a fanout pitch of 5.5 μm. If one wants to make the fanout pitch of the second metal layer 3' be the same as the fanout pitch of the first metal layer 2' to further achieve a narrow bezel design, the second metal layer 3' needs to be made at a line width of 2.0 μm, and the line width open risk is large, so the second metal layer 3' needs to change the design pitch to 5.5 μm. Thus, the fanout pitch size is limited by the resolution of the second metal layer 3', which can only be made to be 5.5 μm, thereby affecting the narrow bezel design of the display panel.

Figure 2:
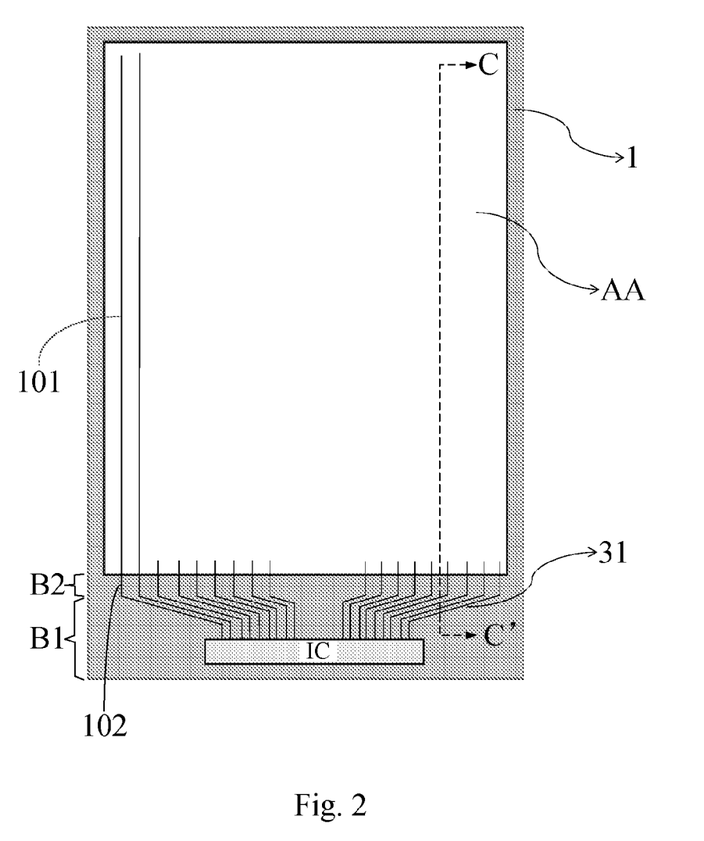
FIG. 2 is a schematic top view of a display substrate provided by some embodiments of the present disclosure.
Figure 3:
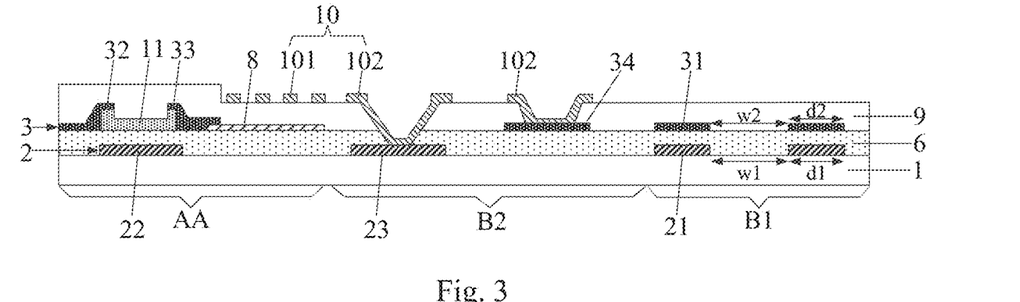
FIG. 3 is a schematic cross-sectional view along the CC= direction in FIG. 2.

In view of this, some embodiments of the present disclosure provide a display substrate, as shown in FIG. 2 and FIG. 3, FIG. 2 is a schematic top view of the display substrate, FIG. 3 is a schematic cross-sectional view along the CC' direction in FIG. 2, and the display substrate includes: a substrate 1 provided with a fanout region B1.

The display substrate includes a first metal layer 2, a flat layer 6, and a second metal layer 3 which are sequentially formed on the substrate 1; an orthographic projection of the flat layer 6 on the substrate 1 at least covers an orthographic projection of the fanout region B1 on the substrate 1; in the fanout region B1, a surface, furthest from the substrate 1, of the flat layer 6 has a highest point having a maximum distance to a horizontal plane where the substrate 1 is located and a lowest point having a minimum distance to the horizontal plane where the substrate 1 is located, and the difference between the distance from the highest point to the horizontal plane where the substrate 1 is located and the distance from the lowest point to the horizontal plane where the substrate 1 is located is less than or equal to 1000 angstroms to guarantee flatness of the surface away from the substrate 1 in the flat layer 6.

The first metal layer 2 includes a plurality of first metal wirings 21 located in the fanout region B1, the second metal layer 3 includes a plurality of second metal wirings 31 located in the fanout region B1, and an orthographic projection of the first metal wirings 21 on the substrate 1 at least partially overlaps with an orthographic projection of the second metal wirings 31 on the substrate 1; optionally, only the plurality of the second metal wirings 31 located in the fanout region B1 are illustrated in FIG. 2, and the plurality of the first metal wirings 21 located in the fanout region B1 are located below the second metal wirings 31.

According to the above display substrate provided by embodiments of the present disclosure, the flat layer 6 is arranged between the first metal layer 2 and the second metal layer 3, and the orthographic projection of the flat layer 6 on the substrate 1 at least covers the orthographic projection of the fanout region B1 on the substrate 1, in the fanout region B1, the surface, furthest from the substrate 1, of the flat layer 6 has the highest point having the maximum distance to the horizontal plane where the substrate 1 is located and the lowest point having the minimum distance to the horizontal plane where the substrate 1 is located, and the difference between the distance from the highest point to the horizontal plane where the substrate 1 is located and the distance from the lowest point to the horizontal plane where the substrate 1 is located is less than or equal to 1000 angstroms; in this way, the surface, facing the second metal layer 3, of the flat layer 6 is relatively flat, thus the second metal layer 3 deposited on the flat layer 6 is also relatively flat, when the second metal layer 3 is subsequently patterned by using a photoresist process to form the plurality of the second metal wirings 31, uniform photoresist thickness of the fanout region B1 can be guaranteed, and the fabrication accuracy of the second metal wirings 31 of the second metal layer 3 can be improved, so that the second metal wirings 31 with the same width and spacing as that of the first metal wirings 21 can be formed. Thus, the etching resolutions of the metal wirings in the fanout region B1 corresponding to the first metal layer 2 and the second metal layer 3 in the solutions of the present disclosure can be the same, thereby reducing the wiring space of the fanout region B1, and further realizing the narrow bezels.

In some embodiments, the distance from the highest point in the surface, furthest from the substrate, of the flat layer to the horizontal plane where the substrate is located is equal to the distance from the lowest point in the surface, furthest from the substrate, of the flat layer to the horizontal plane where the substrate is located. Equality means that the difference between the distance from the highest point to the horizontal plane where the substrate is located and the distance from the lowest point to the horizontal plane where the substrate is located is within an error range, for example, the difference between the distance from the highest point to the horizontal plane where the substrate is located and the distance from the lowest point to the horizontal plane where the substrate is located is less than or equal to 100 angstroms.

In some embodiments, the material of the flat layer may be an organic resin material, such as polyimide, but is not limited thereto.

Figure 4:
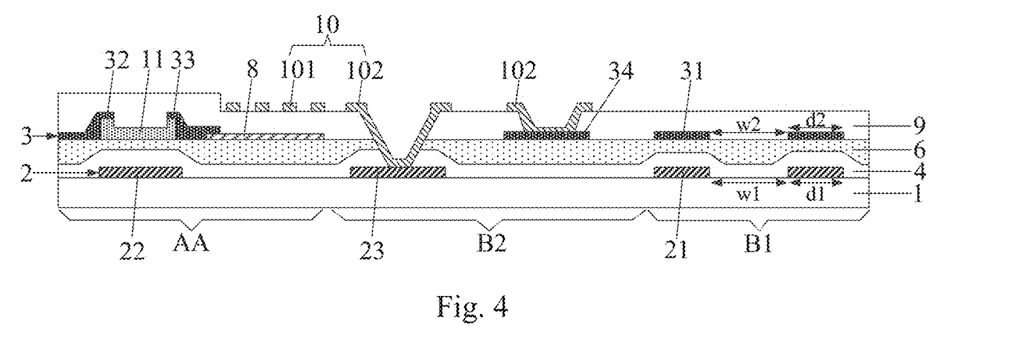
FIG. 4 is another schematic cross-sectional view along the CC' direction in FIG. 2.

In some embodiments, since the material of the flat layer is generally an organic material, the adhesion between the organic material and the metal layer is poor and a subsequently fabricated film layer is easily detached from the substrate, in the above display substrate provided by embodiments of the present disclosure, as shown in FIG. 4, the display substrate further includes a first insulating layer 4 located between the first metal layer 2 and the flat layer 6, wherein an orthographic projection of the first insulating layer 4 on the substrate 1 covers the substrate 1. Optionally, the first insulating layer 4 may employ silicon nitride SiNx, silicon oxide SiOx, or a composite layer of SiNx/SiOx, and the first insulating layer 4 may improve adhesion between the subsequently fabricated film layer and the substrate 1.

Figure 5:
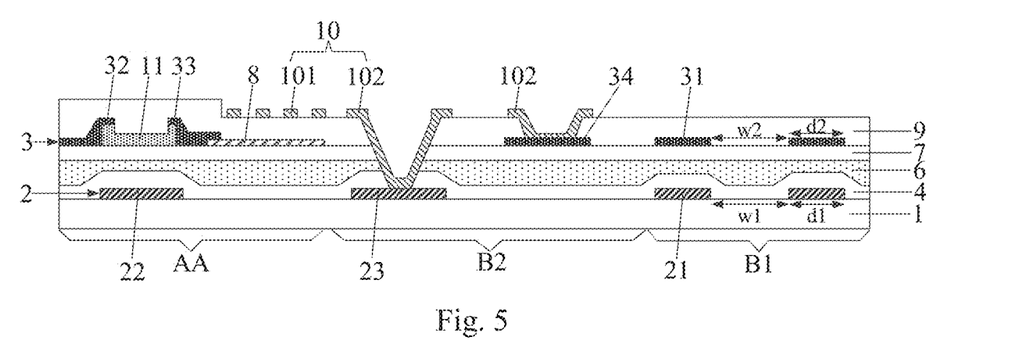
FIG. 5 is another schematic cross-sectional view along the CC' direction in FIG. 2.

In some embodiments, on one hand, due to poor adhesion between the flat layer and the metal layer, and on the other hand, due to the presence of particles in the flat layer of the organic material, which affects the device performance, in the above display substrate provided by the embodiments of the present disclosure, as shown in FIG. 5, the display substrate further includes a second insulating layer 7 located between the flat layer 6 and the second metal layer 3, wherein an orthographic projection of the second insulating layer 7 on the substrate 1 at least covers the orthographic projection of the fanout region B1 on the substrate 1. Optionally, the second insulating layer 7 may employ silicon nitride SiNx, silicon oxide SiOx or a composite layer of SiNx/SiOx.

In some embodiments, in order to further guarantee the flatness of the surface of the flat layer, in the above display substrate provided by some embodiments of the present disclosure, as shown in FIGS. 3-5, the thickness of the flat layer 6 needs to be greater than the thickness of the first metal layer 2, and the specific thickness of the flat layer 6 is selected according to the actual needs, which is not limited.

In some embodiments, since the flat layer with better flatness is arranged between the first metal layer and the second metal layer, the second metal wirings with the same width and spacing as that of the first metal wirings can be formed when the second metal wirings are fabricated in the second metal layer by a photoresist exposure, development and etching process, so in the above display substrate provided by some embodiments of the present disclosure, as shown in FIGS. 3-5, a width d1 of each first metal wiring 21 is the same as a width d2 of each second metal wiring 31, which may be 2.5 μm; and a gap width w1 between adjacent first metal wirings 21 is the same as a gap width w2 between adjacent second metal wirings 31, which may be 2.5 μm. Thus, the etching resolutions of the metal wirings in the fanout region B1 corresponding to the first metal layer 2 and the second metal layer 3 can be the same, thereby reducing the wiring space of the fanout region B1, and further achieving the narrow bezels.

In some embodiments, as shown in FIGS. 3-5, an orthographic projection of the first metal wirings 21 on the substrate 1 completely overlaps with an orthographic projection of the second metal wirings 31 on the substrate 1. That is, the center lines of both the first metal wirings 21 and second metal wirings 31 coincide in the thickness direction of the display substrate. Of course, it is a preferred solution that the orthographic projection of the first metal wirings 21 on the substrate 1 completely overlaps with the orthographic projection of the second metal wirings 31 on the substrate 1, and in other embodiments, the effect of reducing the border can be achieved as long as the two are partially overlapped, but complete overlapping of the orthographic projections can make the effect of shortening the narrow border optimal.

In some embodiments, the display substrate can be a display substrate for an OLED display screen or a display substrate for an LCD display screen, and the embodiments of the present disclosure are exemplified by the display substrate being the display substrate for the LCD display screen. Specifically, by taking the structure shown in FIG. 5 as an example, the film layer structures of other regions in the display substrate will be described in detail, and the same film layer structures as those in FIG. 5 in FIGS. 3 and 4 refer to the schematic diagram of FIG. 5.

In some embodiments, as shown in FIGS. 2 and 5, the substrate 1 is further provided with a display region AA located at one side of the fanout region B1, the first metal layer 2 includes a gate electrode 22 located in the display region AA, and the second metal layer 3 includes a source electrode 32 and a drain electrode 33 which are located in the display region AA; optionally, the display substrate further includes an active layer 11 located between the second insulating layer 7, and the source electrode 32 and the drain electrode 33, and the gate electrode 22, the active layer 11, the source electrode 32 and drain electrode 33 constitute a driving transistor in the display region AA.

In order to improve the performance of devices fabricated in the display region AA, an orthographic projection of the flat layer 6 provided by embodiments of the present disclosure on the substrate 1 also covers an orthographic projection of the display region AA on the substrate 1 to improve the flatness of the display region AA, and the condition that the surface flatness of the flat layer 6 in the display region AA satisfies can refer to the description of the fanout region B1; and the orthographic projection of the second insulating layer 7 on the substrate 1 also covers the orthographic projection of the display region AA on the substrate 1 to solve the problem of particles appearing in the display region AA.

The display substrate further includes a first transparent conductive layer 8 located between the second insulating layer 7 and the second metal layer 3, a passivation layer 9 located on one side, deviating from the substrate 1, of the second metal layer 3, and a second transparent conductive layer 10 located on one side, deviating from the substrate 1, of the passivation layer 9; optionally, due to taking the display substrate being the display substrate for the LCD display screen as an example, the first transparent conductive layer 8 may be a pixel electrode layer and the second transparent conductive layer 10 is a common electrode layer; the material of the first transparent conductive layer 8 and the material of the second transparent conductive layer 10 may be a transparent conductive material such as ITO.

The first transparent conductive layer 8 is electrically connected with the drain electrode 33, the second transparent conductive layer 10 includes a plurality of transparent signal lines 101 located in the display region AA, and an orthographic projection of the first transparent conductive layer 8 on the substrate 1 overlaps with an orthographic projection of the plurality of the transparent signal lines 101 on the substrate 1; optionally, when the LCD display screen performs display, a common electrode signal is loaded to a common electrode through the transparent signal lines 101, a driving signal is loaded to a pixel electrode through the driving transistor, and the liquid crystal of the LCD display screen is driven to flip by an electric field formed between the common electrode and the pixel electrode, and light passes through the liquid crystal layer to realize display.

In some embodiments, the plurality of the transparent signal lines of the second transparent conductive layer need to be led out to the fanout region corresponding to the first metal layer and the second metal layer through a via hole to realize electrical connection with a peripheral driver chip (IC), since the second transparent conductive layer is located in a different layer from the first metal layer and the second metal layer, it needs to be transferred to the fanout region corresponding to the first metal layer and the second metal layer through the via hole, thus in the above display substrate provided by the embodiments of the present disclosure, as shown in FIGS. 2 and 5, the substrate 1 is further provided with a via hole region B2 located between the fanout region B1 and the display region AA, the first metal layer 2 includes a first transfer electrode 23 located in the via hole region B2, and the second metal layer 3 includes a second transfer electrode 34 located in the via hole region B2.

In order to further improve the fabrication flatness of a film layer in the via hole region B2, the orthographic projection of the flat layer 6 provided by embodiments of the present disclosure on the substrate 1 also covers an orthographic projection of a part of the via hole region B2 on the substrate 1, the condition that the surface flatness of the flat layer 6 in the via hole region B2 satisfies can refer to the description of the fanout region B1, and the orthographic projection of the second insulating layer 7 on the substrate 1 also covers the orthographic projection of a part of the via hole region B2 on the substrate 1.

The second transparent conductive layer 10 includes a plurality of transparent wirings 102 located in the via hole region B2.

A part of the transparent wirings 102 are electrically connected with the first transfer electrode 23 by a via hole V1 sequentially through the passivation layer 9, the second insulating layer 7, the flat layer 6 and the first insulating layer 4, and a part of the transparent wirings 102 are electrically connected with the second transfer electrode 34 by a via hole V2 through the passivation layer 9, thereby leading the transparent wirings 102 of the second transparent conductive layer 10 to the fanout region B1 corresponding to the first metal layer 2 and the second metal layer 3, respectively, achieving a design in which the fanout region B1 adopts double-layer metal wirings, and facilitating a narrow bezel design.

It should be noted that the display region AA in FIG. 2 shows only part of the transparent signal lines 101, and of course, the display region AA also includes gate lines, data lines, power lines, etc., which are all electrically connected with the metal wirings (the first metal layer 2 or the second metal layer 3) of the fanout region B1 to be electrically connected to a driver chip (IC) to realize the signal transmission function.

Based on the same inventive concept, some embodiments of the present disclosure also provide a method for manufacturing the display substrate, as shown in FIG. 6, including:

S601 providing a substrate; wherein the substrate is provided with a fanout region;

S602 forming a first metal layer on the substrate; wherein the first metal layer includes a plurality of first metal wirings located in the fanout region;

S603 forming a flat layer on one side, deviating from the substrate, of the first metal layer; wherein an orthographic projection of the flat layer on the substrate at least covers an orthographic projection of the fanout region on the substrate; in the fanout region, a surface, furthest from the substrate, of the flat layer has a highest point having a maximum distance to a horizontal plane where the substrate is located and a lowest point having a minimum distance to the horizontal plane where the substrate is located, and the difference between the distance from the highest point to the horizontal plane where the substrate is located and the distance from the lowest point to the horizontal plane where the substrate is located is less than or equal to 1000 angstroms; and S604 forming a second metal layer on one side, deviating from the substrate, of the flat layer; wherein the second metal layer includes a plurality of second metal wirings located in the fanout region, and an orthographic projection of the first metal wirings on the substrate at least partially overlaps with an orthographic projection of the second metal wirings on the substrate.

According to the method for manufacturing the display substrate provided by embodiments of the present disclosure, the flat layer is fabricated between the first metal layer and the second metal layer, and the orthographic projection of the flat layer on the substrate at least covers the orthographic projection of the fanout region on the substrate, the surface, away from the substrate, of the flat layer includes the highest point and the lowest point, and the difference between the distance from the highest point to the horizontal plane where the substrate is located and the distance from the lowest point to the horizontal plane where the substrate is located is less than or equal to 1000 angstroms; in this way, the surface, facing the second metal layer, of the flat layer is relatively flat, thus the second metal layer deposited on the flat layer is also relatively flat, when the second metal layer is subsequently patterned by using a photoresist process to form the plurality of the second metal wirings, uniform photoresist thickness of the fanout region can be guaranteed, and the fabrication accuracy of the second metal wirings of the second metal layer can be improved, so that the second metal wirings with the same width and spacing as that of the first metal wirings can be formed. Thus, the etching resolutions of the metal wirings in the fanout region corresponding to the first metal layer and the second metal layer in the solutions of the present disclosure can be the same, thereby reducing the wiring space of the fanout region, and further realizing the narrow bezels.

Figure 7:
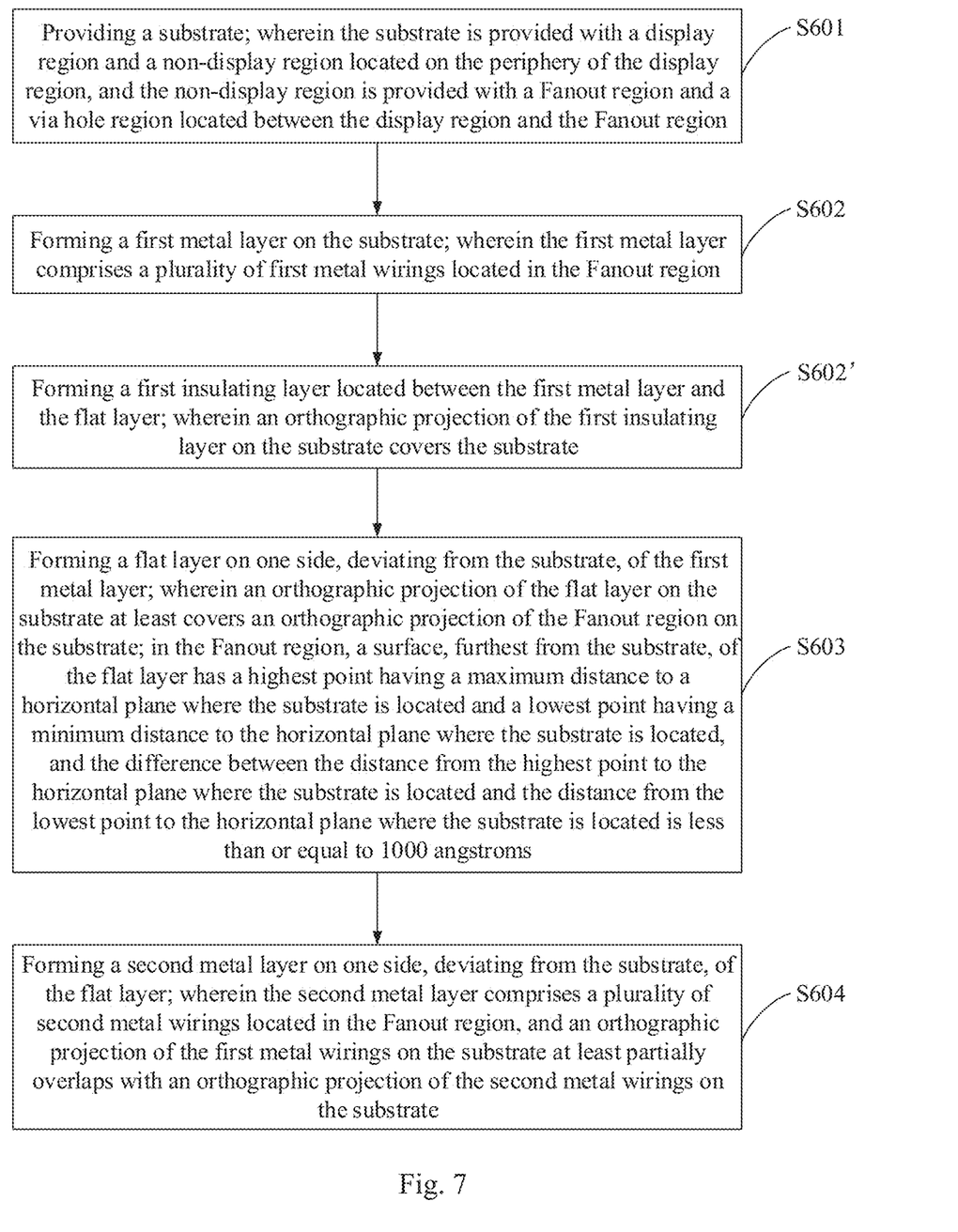
FIG. 7 is a flow diagram of another method for manufacturing a display substrate provided by some embodiments of the present disclosure.

In some embodiments, since the material of the flat layer is generally an organic material, the adhesion between the organic material and the metal layer is poor, and the subsequently fabricated film layer is easily detached from the substrate, and in the above fabrication method provided by the embodiment of the present disclosure, as shown in FIG.

7, before the flat layer is formed on one side, deviating from the substrate, of the first metal layer, the method further includes:

S602' forming a first insulating layer located between the first metal layer and the flat layer; wherein an orthographic projection of the first insulating layer on the substrate covers the substrate. Optionally, the first insulating layer may employ silicon nitride SiNx, silicon oxide SiOx, or a composite layer of SiNx/SiOx, and the first insulating layer may improve adhesion between the subsequently fabricated film layer and the substrate.

In some embodiments, in order to further guarantee the flatness of the surface of the flat layer, in the above fabrication method provided by the embodiments of the present disclosure, forming the flat layer on one side, deviating from the substrate, of the first metal layer specifically includes:

forming the flat layer having a thickness greater than a thickness of the first metal layer on one side, deviating from the substrate, of the first metal layer. In particular, the specific thickness of the flat layer is selected according to the actual needs, which is not limited.

Figure 8:
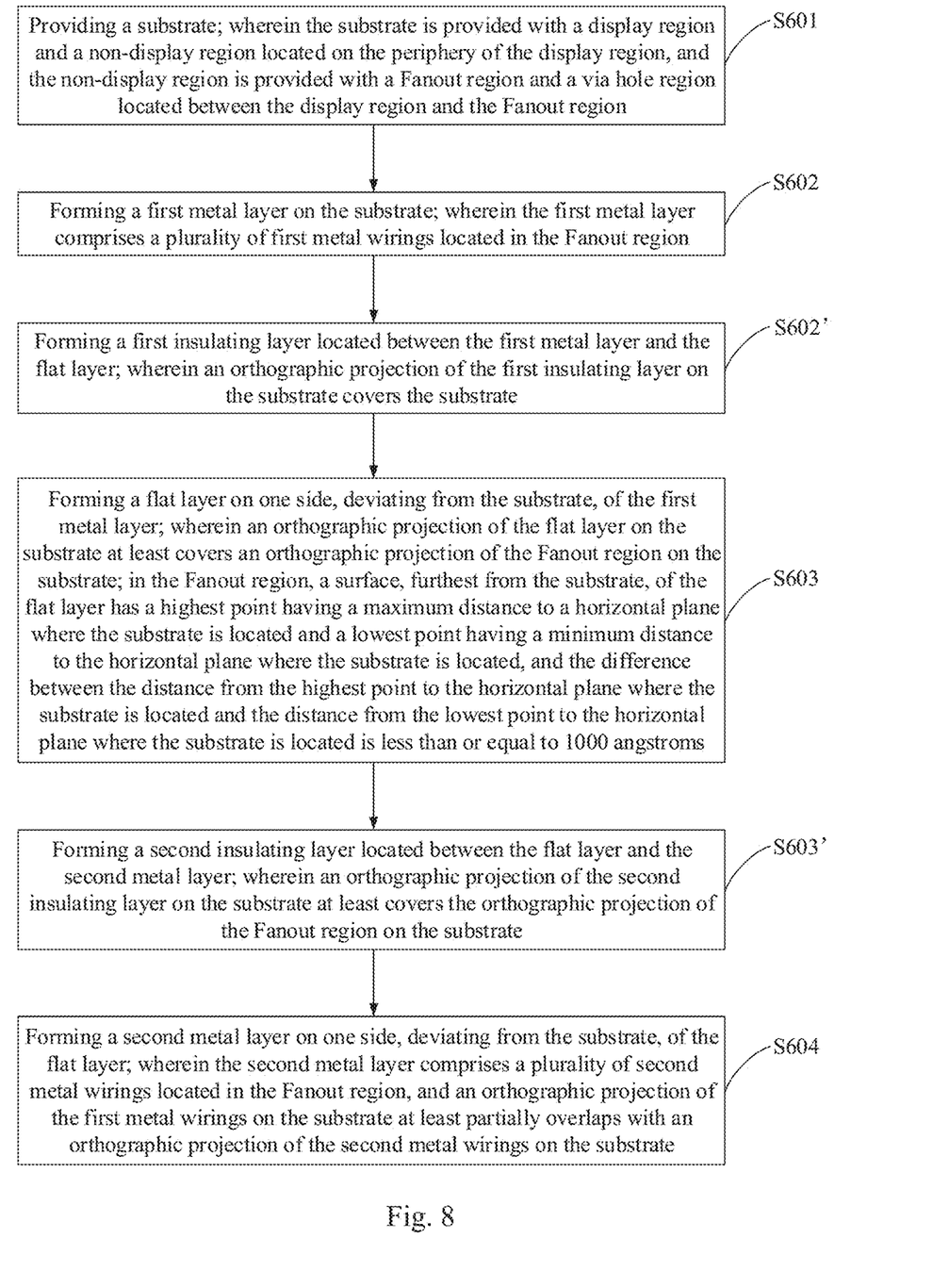
FIG. 8 is a flow diagram of another method for manufacturing a display substrate provided by some embodiments of the present disclosure.

In some embodiments, on one hand, due to poor adhesion between the flat layer and the metal layer, and on the other hand, due to the presence of particles in the flat layer of the organic material, which affects the device performance, in the above method provided by embodiments of the present disclosure, as shown in FIG. 8, after forming the flat layer, and before forming the second metal layer, the method further includes:

S603' forming a second insulating layer located between the flat layer and the second metal layer; wherein an orthographic projection of the second insulating layer on the substrate at least covers the orthographic projection of the fanout region on the substrate. In particular, the second insulating layer may employ silicon nitride SiNx, silicon oxide SiOx, or a composite layer of SiNx/SiOx, the second insulating layer may improve adhesion between the subsequently fabricated film layer and the substrate 1, as well as solve the problem that the presence of particles in the flat layer affects the device performance.

Figure 9:
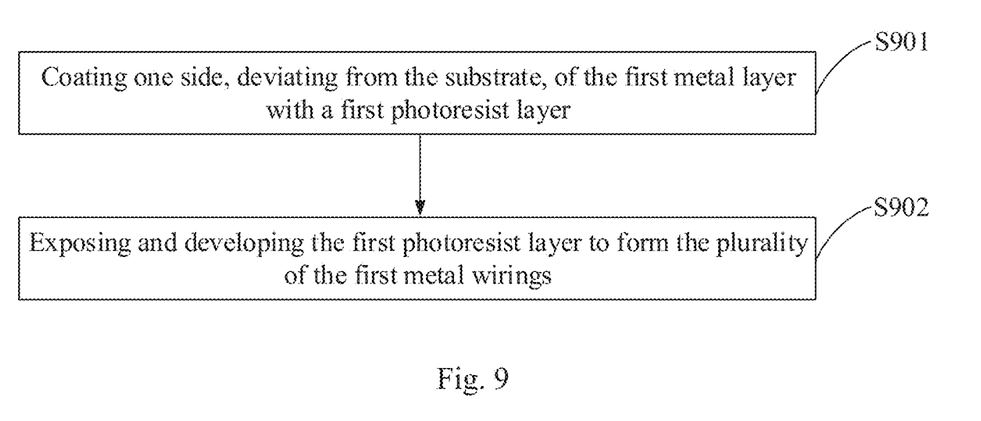
FIG. 9 is a flow diagram of another method for manufacturing a display substrate provided by some embodiments of the present disclosure.

In some embodiments, in the above method provided by embodiments of the present disclosure, as shown in FIG. 9, forming the plurality of the first metal wirings may include:

S901 coating one side, deviating from the substrate, of the first metal layer with a first photoresist layer; and S902 exposing and developing the first photoresist layer to form the plurality of the first metal wirings.

Figure 10:
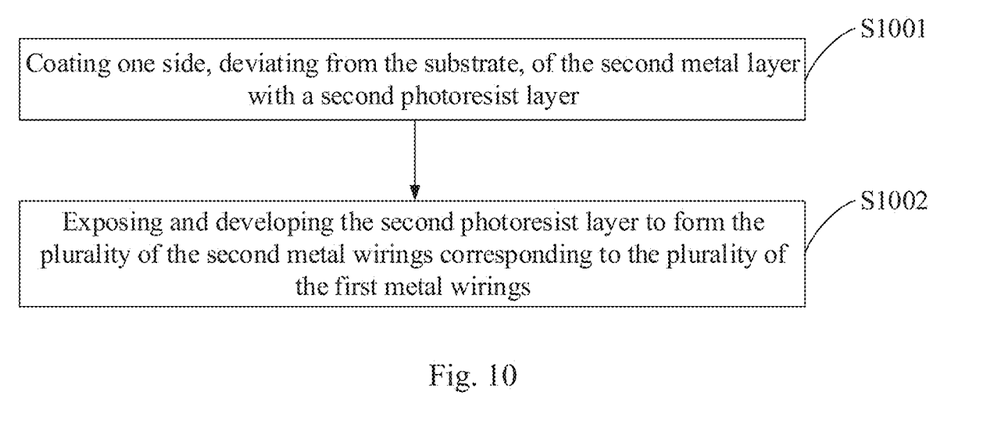
FIG. 10 is a flow diagram of another method for manufacturing a display substrate provided by some embodiments of the present disclosure.

As shown in FIG. 10, forming the plurality of the second metal wirings may specifically include:

S1001 coating one side, deviating from the substrate, of the second metal layer with a second photoresist layer; and S1002 exposing and developing the second photoresist layer to form the plurality of the second metal wirings corresponding to the plurality of the first metal wirings.

By taking FIG. 5 as an example, the method for manufacturing the display substrate provided by embodiments of the present disclosure is described in detail below.

Figure 11A:
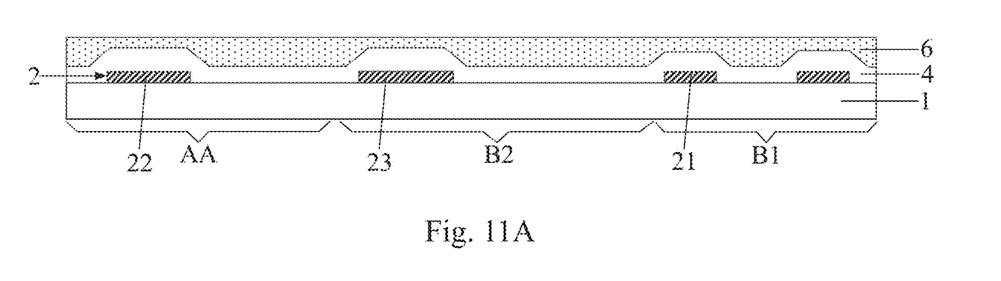
FIG. 11A is a structural schematic diagram of the display substrate corresponding to FIG. 5 after fabrication step 1 is implemented.

(1) The first metal layer 2 is formed on the substrate 1 by a conventional film formation process, one side, deviating from the substrate 1, of the first metal layer 2 is coated with the first photoresist layer (not shown), the first photoresist layer is exposed and developed, the first metal layer 2 is subjected to an etching process to form the gate electrode 22 located in the display region AA, the first transfer electrode 23 located in the via hole region B2, and the first metal wirings 21 located in the fanout region, the material of the first metal layer 2 can be Al/Mo and the thickness of the first metal layer 2 can be about 3400 angstroms; next, the first insulating layer 4 is deposited on one side, deviating from the substrate 1, of the first metal layer 2 by using a PECVD chemical vapor deposition process, the material of the first insulating layer 4 may adopt silicon nitride SiNx, silicon oxide SiOx or a composite layer of SiNx/SiOx, and the first insulating layer 4 has a thickness of about 2000 angstroms; then, the flat layer 6 is fabricated on one side, deviating from the substrate, of the first insulating layer 4 by a gluing baking process, the material of the flat layer 6 may be an organic material, and the flat layer 6 has a thickness of about 5000 angstroms, as shown in FIG. 11A.

Figure 11B:
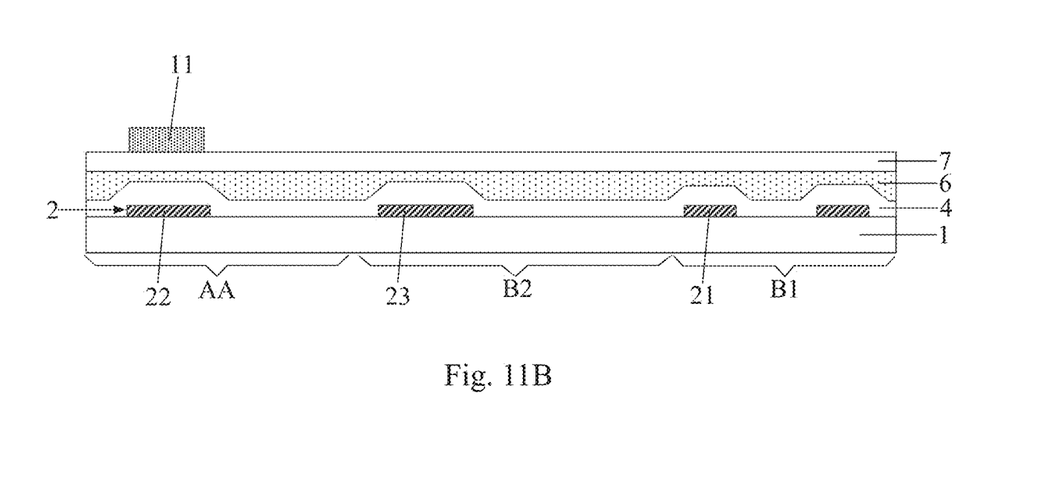
FIG. 11B is a structural schematic diagram of the display substrate corresponding to FIG. 5 after fabrication step 2 is implemented.

(2) The second insulating layer 7 is deposited on one side, deviating from the substrate 1, of the flat layer 6 by using the PECVD chemical vapor deposition process, the material of the second insulating layer 7 may adopt silicon nitride SiNx, silicon oxide SiOx or a composite layer of SiNx/SiOx, and the second insulating layer 7 has a thickness of about 2000 angstroms; the PECVD chemical vapor deposition process is then used to deposit a a-Si material on one side, deviating from the substrate 1, of the second insulating layer 7, the thickness of the a-Si material may be about 1800 angstroms, and then, the silicon island pattern of the active layer 11 is formed by exposure, dry etching and stripping processes, as shown in FIG. 11B.

Figure 11C:
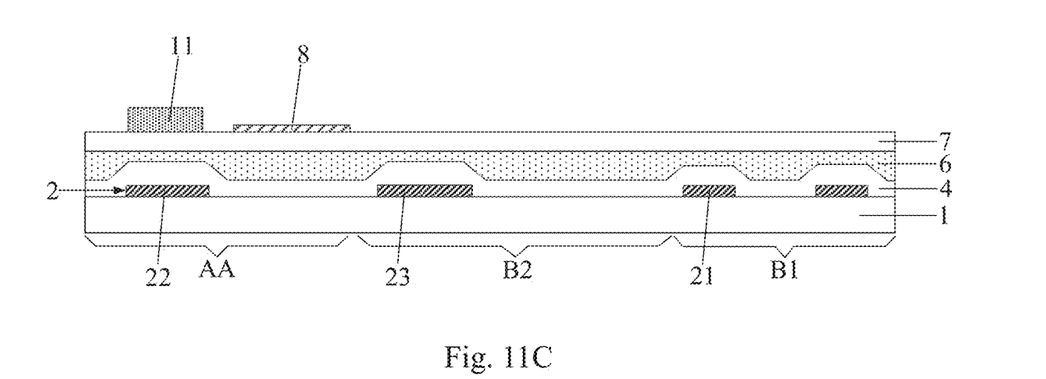
FIG. 11C is a structural schematic diagram of the display substrate corresponding to FIG. 5 after fabrication step 3 is implemented.

(3) The first transparent conductive layer 8 is formed on the second insulating layer 7 by conventional sputtering film-forming, photoetching, and etching processes, the material of the first transparent conductive layer 8 may be a transparent conductive material such as ITO, and the thickness of the first transparent conductive layer 8 may be about 400 angstroms, as shown in FIG. 11C.

Figure 11D:
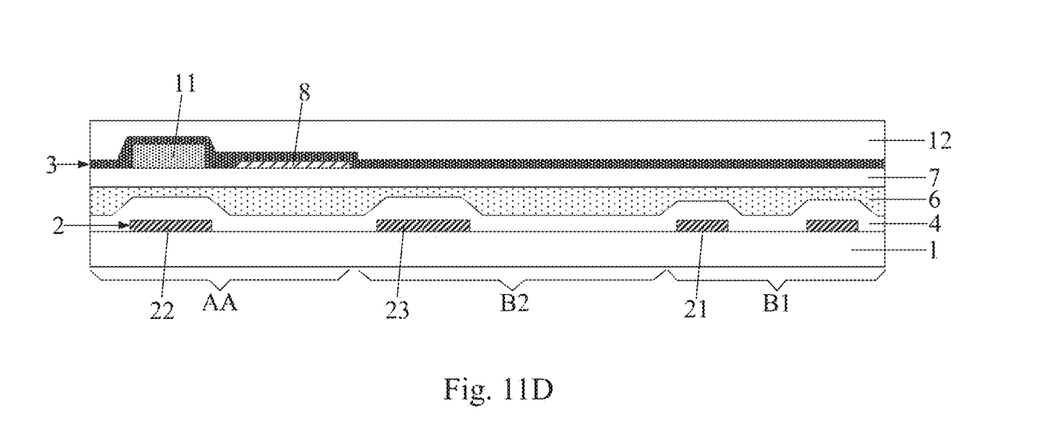
FIG. 11D is a structural schematic diagram of the display substrate corresponding to FIG. 5 after fabrication step 4 is implemented.

(4) The second metal layer 3 is evaporated based on the step (3) by using a sputtering process, the material of the second metal layer 3 may be a Mo/Al/Mo three-layer metal layer, the corresponding thickness of the three-layer metal layer is about 150/2000/800 angstroms, at this time, the surface of the second metal layer 3 corresponding to the fanout region B1 is a flat surface, one side, deviating from the substrate 1, of the second metal layer 3 is coated with the second photoresist layer 12, and the surface of the second photoresist layer 12 is a flat surface, as shown in FIG. 11D.

Figure 11E:
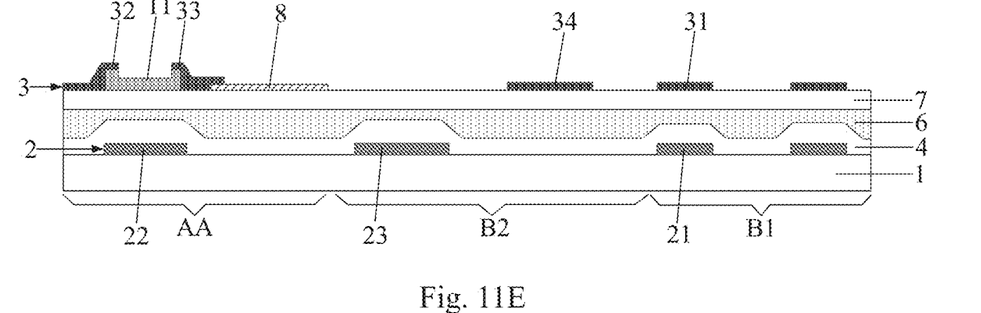
FIG. 11E is a structural schematic diagram of the display substrate corresponding to FIG. 5 after fabrication step 5 is implemented.

(5) The second photoresist layer 12 is exposed and developed, an etching process is performed on the second metal layer 3 to form the source electrode 32 and the drain electrode 33 which are located in the display region AA, the second transfer electrode 34 located in the via hole region B2, and the second metal wirings 31 located in the fanout region, the material of the second metal layer 2 can be Al/Mo and the thickness of the second metal layer 2 can be about 3400 angstroms, since the surface of the second metal layer 3 is flat, at this time, the exposure resolution of the fanout region B1 is equivalent to that of the first metal layer 2, and the line width and line spacing of the first metal wirings 21 of the first metal layer 2 are consistent with those of the second metal wirings 31 of the second metal layer 3, as shown in FIG. 11E.

Figure 11F:
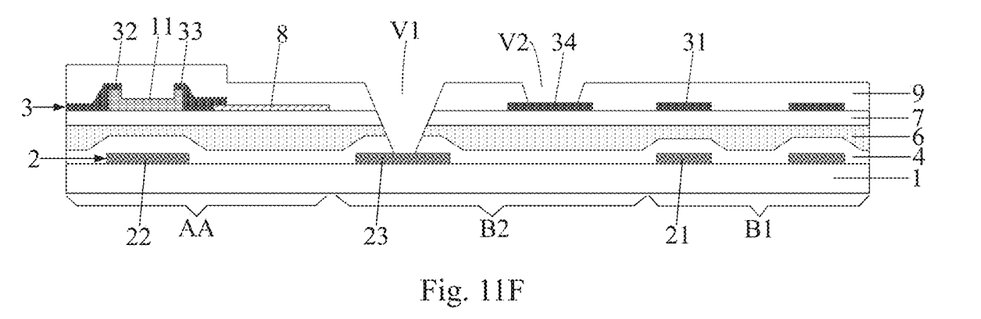
FIG. 11F is a structural schematic diagram of the display substrate corresponding to FIG. 5 after fabrication step 6 is implemented.

(6) A film is formed on one side, deviating from the substrate 1, of the second metal layer 3 by using the PECVD chemical vapor deposition process, the passivation layer 9 with the via holes V1 and V2 is fabricated in the via hole region B2 by an exposure and etching process, the material of the passivation layer 9 may be SiNx, and the thickness of the passivation layer 9 may be about 6000 angstroms, as shown in FIG. 11F.

(7) The second transparent conductive layer 10 is formed on one side, deviating from the substrate 1, of the passivation layer 9 by using a sputtering film-forming process, the transparent signal lines 101 located in the display region AA and the transparent wirings 102 located in the via hole region B2 are formed by the exposure and etching process, the material of the second transparent conductive layer 10 may be a transparent conductive material such as ITO and the thickness of the second transparent conductive layer 10 may be about 700 angstroms, as shown in FIG. 5.

By the steps (1)-(7), the display substrate shown in FIG. 5 can be formed.

In summary, the line width and line spacing of the first metal wirings 21 of the first metal layer 2 finally formed by the above solution of the present disclosure may be 2.5 µm/2.5 µm, and the fanout pitch is 5.0 µm; the line width and line spacing of the second metal wirings 31 of the second metal layer 3 may be 2.5 µm/2.5 µm, and the fanout pitch is 5.0 µm; however, in the prior art, due to the limitation of the exposure resolution of the second metal layer, the line width and line spacing can only be 2.5 µm/3.0 µm, and the fanout pitch is 5.5 µm. Therefore, the solutions of the present disclosure can reduce the wiring space in the fanout region, thereby further realizing the narrow bezel design.

In addition, some embodiments of the present disclosure only need to form the flat layer between the second metal layers, and the adopted process flow does not need to add a mask, has high compatibility with the prior art and saves cost.

Based on the same inventive concept, some embodiments of the present disclosure also provide a display device, including the above display substrate provided by embodiments of the present disclosure. The principle of solving the problem of the display device is similar to that of the aforementioned display substrate, so the implementation of the display device can refer to the implementation of the aforementioned display substrate, and the repetition will not be repeated here.

In some embodiments, the above display device provided by embodiments of the present disclosure may be an organic light-emitting display device or a liquid crystal display device, which is not limited here.

In some embodiments, the above display device may be a full-screen display device, a flexible display device, or the like, which is not limited here.

Figure 12:
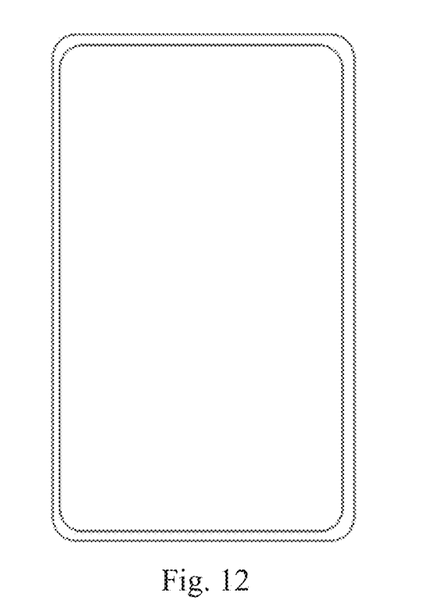
FIG. 12 is a structural schematic diagram of a display device provided by some embodiments of the present disclosure.

In some embodiments, the above display device may be a full-screen cell phone as shown in FIG. 12. Of course, the above display device may also be any product or component with a display function, such as a tablet computer, a television, a display, a notebook computer, a digital photo frame, a navigator, and the like. Other essential components of the display device should be understood by those of ordinary skill in the art and will not be described herein and should not be taken as a limitation of the present disclosure.

According to the display substrate, the method for manufacturing the display substrate, and the display device provided by embodiments of the present disclosure, the flat layer is arranged between the first metal layer and the second metal layer, and the orthographic projection of the flat layer on the substrate at least covers the orthographic projection of the fanout region on the substrate, in the fanout region, the surface, furthest from the substrate, of the flat layer has the highest point having the maximum distance to the horizontal plane where the substrate is located and the lowest point having the minimum distance to the horizontal plane where the substrate is located, and the difference between the distance from the highest point to the horizontal plane where the substrate is located and the distance from the lowest point to the horizontal plane where the substrate is located is less than or equal to 1000 angstroms; in this way, the surface, facing the second metal layer, of the flat layer is relatively flat, thus the second metal layer deposited on the flat layer is also relatively flat, when the second metal layer is subsequently patterned by using a photoresist process to form the plurality of the second metal wirings, uniform photoresist thickness of the fanout region can be guaranteed, and the fabrication accuracy of the second metal wirings of the second metal layer can be improved, so that the second metal wirings with the same width and spacing as that of the first metal wirings can be formed. Thus, the etching resolutions of the metal wirings in the fanout region corresponding to the first metal layer and the second metal layer in the solutions of the present disclosure can be the same, thereby reducing the wiring space of the fanout region, and further realizing the narrow bezels.

While the preferred embodiments of the present disclosure have been described, those skilled in the art may make additional changes and modifications to these embodiments once they know the basic inventive concept. Therefore, the appended claims are intended to be interpreted as including preferred embodiments and all changes and modifications falling within the scope of the present disclosure.

Obviously, those skilled in the art can make various changes and modifications to the embodiments of the present disclosure without departing from the spirit and scope of the embodiments of the present disclosure. Thus, if these changes and modifications of the embodiments of the present disclosure fall within the scope of the claims of the present disclosure and its equivalent technology, the present disclosure is also intended to include these changes and modifications.

What is claimed is:

1. A display substrate, comprising a substrate provided with a fanout region;

the display substrate comprises a first metal layer, a flat layer, and a second metal layer which are sequentially formed on the substrate; an orthographic projection of the flat layer on the substrate at least covers an orthographic projection of the fanout region on the substrate; in the fanout region, a surface, furthest from the substrate, of the flat layer comprises a highest point having a maximum distance to a horizontal plane where the substrate is located and a lowest point having a minimum distance to the horizontal plane where the substrate is located, and a difference between the maximum distance and the minimum distance is less than or equal to 1000 angstroms; and the first metal layer comprises a plurality of first metal wirings located in the fanout region, the second metal layer comprises a plurality of second metal wirings located in the fanout region, and an orthographic projection of the first metal wirings on the substrate at least partially overlaps with an orthographic projection of the second metal wirings on the substrate;

wherein the display substrate further comprises a second insulating layer located between the flat layer and the second metal layer, wherein an orthographic projection of the second insulating layer on the substrate at least covers the orthographic projection of the fanout region on the substrate;

wherein the substrate further comprises a display region located at one side of the fanout region, the first metal layer comprises a gate electrode located in the display region, and the second metal layer comprises a source electrode and a drain electrode which are located in the display region;

an orthographic projection of the flat layer on the substrate also covers an orthographic projection of the display region on the substrate, and the orthographic projection of the second insulating layer on the substrate also covers the orthographic projection of the display region on the substrate;

the display substrate further comprises a first transparent conductive layer located between the second insulating layer and the second metal layer, a passivation layer located on one side, deviating from the substrate, of the second metal layer, and a second transparent conductive layer located on one side, deviating from the substrate, of the passivation layer; and the first transparent conductive layer is electrically connected with the drain electrode, the second transparent conductive layer comprises a plurality of transparent signal lines located in the display region, and an orthographic projection of the first transparent conductive layer on the substrate overlaps with an orthographic projection of the plurality of the transparent signal lines on the substrate.

2. The display substrate according to claim 1, wherein the maximum distance is equal to the minimum distance.

3. The display substrate according to claim 1, further comprising a first insulating layer located between the first metal layer and the flat layer, wherein an orthographic projection of the first insulating layer on the substrate covers the substrate.

4. The display substrate according to claim 1, wherein a thickness of the flat layer is greater than a thickness of the first metal layer.

5. The display substrate according to claim 1, wherein the substrate further comprises a via hole region located between the fanout region and the display region, the first metal layer comprises a first transfer electrode located in the via hole region, and the second metal layer comprises a second transfer electrode located in the via hole region;

the orthographic projection of the flat layer on the substrate also covers an orthographic projection of a part of the via hole region on the substrate, and the orthographic projection of the second insulating layer on the substrate also covers the orthographic projection of a part of the via hole region on the substrate;

the second transparent conductive layer comprises a plurality of transparent wirings located in the via hole region;

a part of the transparent wirings are electrically connected with the first transfer electrode by a via hole sequentially running through the passivation layer, the second insulating layer, the flat layer, and the first insulating layer; and a part of the transparent wirings are electrically connected with the second transfer electrode by a via hole running through the passivation layer.

6. The display substrate according to claim 1, wherein a width of each first metal wiring is identical to a width of each second metal wiring, and a gap width between adjacent first metal wirings is identical to a gap width between adjacent second metal wirings.

7. The display substrate according to claim 6, wherein an orthographic projection of the first metal wirings on the substrate completely overlaps with an orthographic projection of the second metal wirings on the substrate.

8. A method for manufacturing a display substrate, comprising:

providing a substrate; wherein the substrate comprises a fanout region;

forming a first metal layer on the substrate; wherein the first metal layer comprises a plurality of first metal wirings located in the fanout region;

forming a flat layer on one side, deviating from the substrate, of the first metal layer; wherein an orthographic projection of the flat layer on the substrate at least covers an orthographic projection of the fanout region on the substrate; in the fanout region, a surface, furthest from the substrate, of the flat layer comprises a highest point having a maximum distance to a horizontal plane where the substrate is located and a lowest point having a minimum distance to the horizontal plane where the substrate is located, and a difference between the maximum distance and the minimum distance is less than or equal to 1000 angstroms; and forming a second metal layer on one side, deviating from the substrate, of the flat layer; wherein the second metal layer comprises a plurality of second metal wirings located in the fanout region, and an orthographic projection of the first metal wirings on the substrate at least partially overlaps with an orthographic projection of the second metal wirings on the substrate;

wherein the forming the plurality of the first metal wirings comprises:

coating one side, deviating from the substrate, of the first metal layer with a first photoresist layer; and exposing and developing the first photoresist layer to form the plurality of the first metal wirings;

the forming the plurality of the second metal wirings comprises:

coating one side, deviating from the substrate, of the second metal layer with a second photoresist layer; and exposing and developing the second photoresist layer to form the plurality of the second metal wirings corresponding to the plurality of the first metal wirings.

9. The method according to claim 8, further comprising: before forming the flat layer on one side, deviating from the substrate, of the first metal layer, forming a first insulating layer located between the first metal layer and the flat layer; wherein an orthographic projection of the first insulating layer on the substrate covers the substrate.

10. The method according to claim 8, wherein the forming the flat layer on one side, deviating from the substrate, of the first metal layer comprises:

forming the flat layer having a thickness greater than a thickness of the first metal layer on one side, deviating from the substrate, of the first metal layer.

11. The method according to claim 8, further comprising: after forming the flat layer, and before forming the second metal layer, forming a second insulating layer located between the flat layer and the second metal layer; wherein an orthographic projection of the second insulating layer on the substrate at least covers the orthographic projection of the fanout region on the substrate.

12. A display device, comprising the display substrate according to claim 1.

13. The display device according to claim 12, wherein a width of each first metal wiring is identical to a width of each second metal wiring, and a gap width between adjacent first metal wirings is identical to a gap width between adjacent second metal wirings.

14. The display device according to claim 12, wherein a thickness of the flat layer is greater than a thickness of the first metal layer.

15. The display device according to claim 12, wherein the maximum distance is equal to the minimum distance.

16. The display device according to claim 12, further comprising a first insulating layer located between the first metal layer and the flat layer, wherein an orthographic projection of the first insulating layer on the substrate covers the substrate.

\* \* \* \* \*